[19] United States Patent
Barkow

[11] 3,907,910
[45] Sept. 23, 1975

[54] PROCESS AND APPARATUS FOR PRODUCTION OF HEXACHLOROBENZENE

[76] Inventor: Werner T. W. Barkow, pase de Gracia 56, Barcelona, Spain

[22] Filed: June 3, 1970

[21] Appl. No.: 43,009

[30] Foreign Application Priority Data
June 3, 1969 Spain .................................. 368.356

[52] U.S. Cl. ............................. 260/650 R; 423/481
[51] Int. Cl.$^2$ ......................................... C07C 25/12
[58] Field of Search ................................ 260/650 R

[56] References Cited
UNITED STATES PATENTS

| | | | |
|---|---|---|---|
| 2,395,777 | 2/1946 | Brunjes et al. .................. | 260/650 R |
| 2,527,606 | 10/1950 | Webb .............................. | 260/650 R |
| 2,777,003 | 1/1957 | Nicolaisen ...................... | 260/650 R |
| 3,259,561 | 7/1966 | Sievers ............................ | 260/650 R |

FOREIGN PATENTS OR APPLICATIONS

| 1,213,826 | 4/1966 | Germany ........................ | 260/650 R |
|---|---|---|---|

Primary Examiner—Howard T. Mars
Attorney, Agent, or Firm—Werner W. Kleeman

[57] ABSTRACT

A process for the continuous production of hexachlorobenzene by reacting lower chlorinated chlorobenzenes in the presence of catalyst with chlorine gas in a counter current at elevated temperature in a vertical chlorinator which is fed with chlorine at the bottom and with the lower chlorinated chlorobenzenes at the top using trichlorobenzene and/or tetrachlorobenzene as starting material which is reacted in a single operation with 90–100% by weight of that amount of chlorine which is required theoretically to fully convert the starting material into hexachlorobenzene while heating at least a part of the lower third of the chlorinator to produce a temperature above about 200°C in the lower part of the chlorinator, the temperature in said part being sufficient to achieve substantially complete hexachlorination while preventing solidification of the hexachlorobenzene product in said lower part, and cooling at least a part of the top two third of the chlorinator to withdraw heat of reaction formed in said upper part and to form a product containing at least 90% by weight of hexachlorobenzene; and apparatus for producing high purity hexachlorobenzene in a single operation, said apparatus comprising a chlorinator column with heating and cooling means arranged to achieve a predetermined temperature distribution over the longitudinal dimension of said column.

3 Claims, 3 Drawing Figures

PROCESS AND APPARATUS FOR PRODUCTION OF HEXACHLOROBENZENE

BACKGROUND OF THE INVENTION

This invention relates to the production of hexachlorobenzene by nuclear substitution chlorination of partially nuclear chlorine substituted benzenes, and to an apparatus for carrying out such production. More specifically, the invention relates to a continuous process for the production of hexachlorobenzene in a counter current process, using as the starting material a lower chlorobenzene selected from the group consisting of trichlorobenzene, tetrachlorobenzene and mixtures thereof to produce a high purity product comprising at least 90% hexachlorobenzene in a single stage process.

U.S. Pat. No. 2,777,003 issued Jan. 8, 1957 to BERNARD H. NICOLAISEN discloses a counter current process for the production of hexachlorobenzene. According to this prior art process a stream of benzene hydrocarbons susceptible to chlorine substitution is circulated cyclically between a chlorination zone maintained at approximately atmospheric pressure and at a temperature within the range of 150°–200°C and a crystallization zone maintained at a minimum temperature of about 100°C. Gaseous chlorine is added to the stream in the chlorination zone in an amount calculated to yield a hexachlorobenzene concentration of about 20–50% by weight in the stream leaving the chlorination zone. The low temperature in the crystallization zone results in the crystallization of the hexachlorobenzene content of the stream which is then separated from the stream. The stream of benzene hydrocarbons separated from the crystallization plus additional starting material is returned to the chlorination zone. The preferred temperature in the chlorinator according to this prior art process is in the range of 160°–180°C. Accordingly, the expressed aim of this prior art process is a partial conversion of the starting material into hexachlorobenzene product which is separated from the lower chlorinated products or unreacted starting material in a separate second process stage, i.e. the crystallization zone.

SUMMARY OF THE INVENTION

A primary object of the present invention is a process for the direct production of high purity hexachlorobenzene in a single stage operation.

A further object of the invention is a process for a substantially complete chlorination of the starting material in a single stage operation without essential recirculation.

Another object is the production of hexachlorobenzene product without the necessity to separate other chlorobenzenes from the product.

Another object is a process for the production of high grade hexachlorobenzene having a purity of at least 90% by weight, preferably a purity of above 95% by weight and specifically a purity between 96 and 99.9% by weight.

Still a further object is an improved apparatus for the production of substantially pure hexachlorobenzene in a single stage.

Yet another object is a process and apparatus for producing high grade hexachlorobenzene with improved yield and in a more economic way.

Other objects will become apparent as the specification proceeds.

The above objects and further advantages can be achieved by the process of the invention which comprises continuously reacting a lower chlorinated chlorobenzene selected from the group consisting of trichlorobenzene, tetrachlorobenzene and mixtures thereof in the presence of catalyst in a single stage and counter currently at elevated temperatures in a substantially vertical reaction column or chlorinator with gaseous chlorine supplied at the lower end of the reactor at a rate of 90–100% by weight of the amount of chlorine theoretically required for complete conversion of said starting chlorobenzene to directly produce a product consisting at least of 90% by weight of hexachlorobenzene while heating at least a part of the lowest third of the chlorinator to generate in said chlorinator a zone extending substantially over said lower third of said chlorinator, said zone having a temperature of above about 200°C which is sufficient to achieve a substantially complete hexachlorination in said zone and preventing solidification of the hexachlorobenzene product therein, and cooling at least a part of the top two thirds of the chlorinator to withdraw sufficient heat of reaction from the reaction zone to said upper two thirds of said chlorinator to generate an upper reaction zone having a temperature distribution decreasing in the direction towards the top of said chlorinator.

According to a further preferred embodiment, the invention comprises an apparatus for the continuous production of hexachlorobenzene by chlorination of a chlorobenzene selected from the group consisting of trichlorobenzene, tetrachlorobenzene and mixtures thereof, said apparatus comprising a substantially vertical cylindrical chlorinator or reaction column consisting of a material which is essentially resistant against chlorine gas under the process conditions, the lowest third of said chlorinator comprising an external heating means, the upper part of said chlorinator comprising an external cooling means, said chlorinator further comprising a feeding conduit for the chlorobenzene and a withdrawing conduit for hydrogen chloride at the top of said chlorinator, and a feeding conduit for introducing chlorine gas near the bottom of said chlorinator, and said apparatus including a collecting means for the liquid hexachlorobenzene product.

BRIEF DESCRIPTION OF THE DRAWINGS

The invention will now be explained and illustrated in more detail with reference to the attached drawings which represent preferred embodiments and are not intended to limit the invention.

DETAILED DESCRIPTION OF THE PREFERRED EMBODIMENTS

Figure 1:
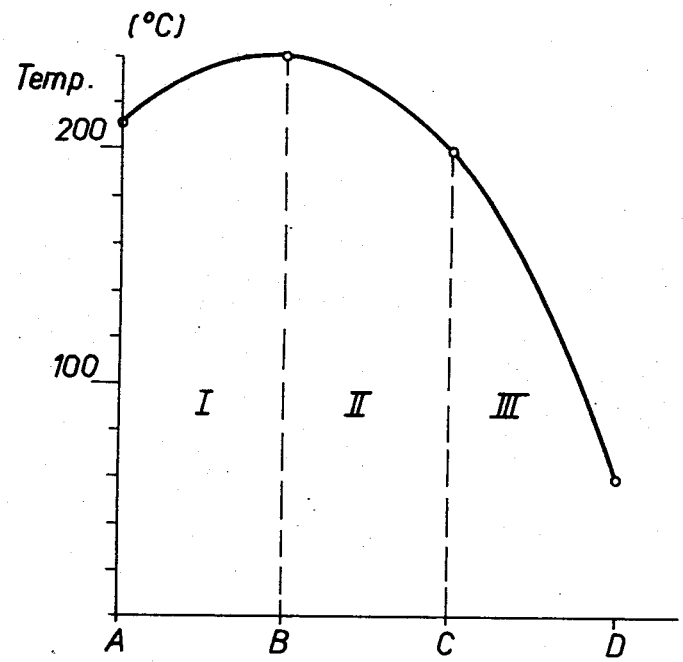
FIG. 1 shows a temperature diagram illustrating a temperature distribution in longitudinal direction substantially at the center of the reaction in a typical embodiment of the process.

In the diagram of FIG. 1 the ordinate represents the temperature in degrees Centigrade while the abscissa represents the length of the chlorinator to show a model of the reaction zones therein. The curve, therefore, shows the temperature distribution of continuous chlorination according to the invention in the longitudinal direction of the chlorinator, measured substantially at the center of the chlorinator in a preferred operation of the present process. For practical purposes the line between A and D on the abscissa substantially represents the height of the chlorinator, A corresponding to the bottom, D to the top of the chlorinator column. Three reaction zones can be postulated in a continuous chlorination of trichlorobenzene according to the invention: the first or top zone (C–D) generally coincides with the upper third part of the chlorinator. In this zone there is substantial conversion of the starting trichlorobenzene into tetrachlorobenzene. In the second or middle zone (B–C) corresponding roughly to the middle third of the chlorinator there is substantial conversion of tetrachlorobenzene into pentachlorobenzene. In the third or bottom zone (A–B) corresponding roughly to the lowest third of the chlorinator there is substantially full (at least 90% by weight) conversion of pentachlorobenzene and any other lower chlorobenzene still present and carried over from a preceding zone into hexachlorobenzene.

It is to be noted that the distribution of zones illustrated in FIG. 1 is intended to represent a model only. In reality the zones will overlap each other in varying degrees depending upon the process conditions explained below in more detail.

The investigations leading to the present invention have shown that the heat of reaction formed in the various stages of the transition of tri- or tetrachlorobenzene into hexachlorobenzene are different and that, in order to produce substantially pure hexachlorobenzene in a continuous single stage operation, the actual temperatures in the various zones must be controlled differently. In the area I between A and B the heat of reaction is comparatively low and without additional heat supplied to this zone no complete conversion into hexachlorobenzene will be achieved in continuous counter current reaction. Also, unless additional heat is supplied to zone I the product formed would solidify and prevent or reduce continuity of operation. On the other hand, the heat of reaction in zones II (between B and C) and III (between C and D) is so high that cooling is required in order to achieve the aims of the process of the invention.

The temperature at A generally is about 210°C with variations of 10°C or more in both directions, regardless of whether tri- or tetrachlorobenzene is used as the starting material. The lowest practical temperature at this point depends somewhat upon the melting point of the product, i.e. its composition. Pure hexachlorobenzene melts at 227°C, whereas pure pentachlorobenzene melts at only 91°C. If the product obtained according to the invention contains only 0.5–5% by weight of pentachlorobenzene the melting point of the product the balance of which consists essentially of hexachlorobenzene and trace amounts of catalyst is reduced considerably and this may have advantages both for the process and the handling of the final product. It should be noted, however, that a 99.9% pure hexachlorobenzene can easily be obtained according to the invention.

It is relatively difficult to achieve a temperature of substantially above 220°C at A in practical commercial operation without the danger of overheating the following zones. This is due to the fact that chlorine gas for the reaction must be introduced in the lower part of the reaction column, and the degree of pre-heating chlorine gas is somewhat limited for practical reasons. Preferably, the chlorine gas, however, is pre-heated prior to its introduction into the reaction to a temperature of above 50°C and preferably about 90°–110°C. This can be achieved by means well known in the art of chlorination.

At the transition from zone I to zone II a temperature of about 240°C should be achieved in the center of the chlorinator. Some variation of the temperature at this point, e.g. about 10°C in both directions, will not normally be disadvantageous for continuous operation. Larger deviations are generally not preferred.

For the reasons explained above heat of reaction must be withdrawn in zones II and III. The actual point where this heat is withdrawn (by conventional cooling means) is not overly critical provided that the temperature distribution explained in FIG. 1 is substantially achieved, i.e. with the variations disclosed. The temperature at the boarder line between zones II and III should be about 200°C and again variations are admissible, preferably not exceeding 20°C in either direction. Preferably, more heat is withdrawn from zone III so that the temperature at the end of zone III, i.e. around D, should be about 60°C with permissible variations of about 30°–40°C in either direction.

It is to be noted that the use of tetrachlorobenzene, or of a mixture containing this component in a major amount, will not cause basic changes of the temperature distribution of FIG. 1. In general, the use of tetrachlorobenzene or its mixtures will enable a higher throughput compred with the use of only trichlorobenzene.

IT should be noted that the terms "trichlorobenzene" and "tetrachlorobenzene" do not necessarily imply chemically pure substances or anything near it. In contrast, the terms are used to specifically include commercial products of the type normally obtained as by-products of other technical processes, e.g. the production of lindane. These commercial by-products said to be trichlorobenzene or tetrachlorobenzene normally are mixtures of various compound isomers containing varying degrees of impurities including higher and lower chlorinated benzenes. The use of such technical substances, however, normally has no disadvantageous effect upon the process of the invention.

Figure 2:
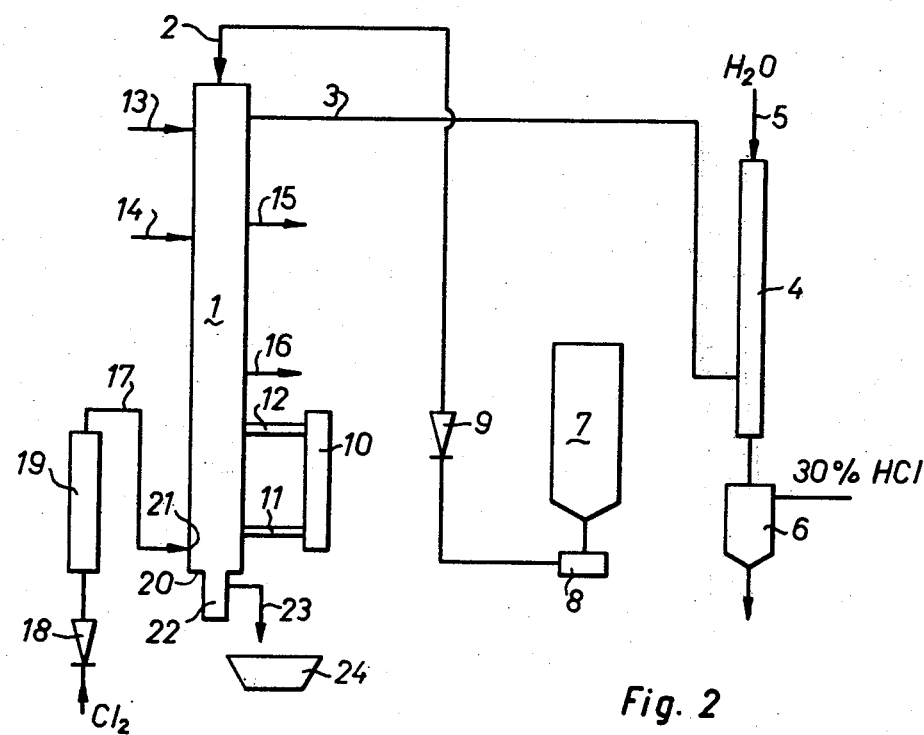
FIG. 2 shows a diagrammatic sectional view of a preferred apparatus according to the invention.

The apparatus illustrated in FIG. 2 in a diagrammatic and sectional view includes the chlorinator or reaction column 1 which is fed with trichlorobenzene or/and tetrachlorobenzene through feeding line 2. A withdrawing line 3 for the hydrogen chloride formed in the reaction is provided at the top of the chlorinator. The hydrogen chloride withdrawn is saturated with the starting chlorobenzene present at the top of the column in accordance with the partial pressure under the operating conditions in that area. Accordingly, minor amounts, e.g. up to 5% by weight, of the starting chlorobenzene are withdrawn together with the hydrogen chloride, the actual amount increasing with the temperature of the HCl. This mixture is introduced into an absorber 4 which is fed with water at 5 to form hydrochloric acid. The product obtained in the absorber is fed into a separator 6 to extract the chlorobenzene withdrawn together with the hydrogen chloride. Preferably, the amount of water supplied to absorber 4 is controlled to yield a hydrochloric acid having a HCl concentration of about 30 % by weight. The chlorobenzene obtained in the separator 6 can be returned into the supply tank 7. Chlorinator 1 is supplied with trichloro- or tetrachlorobenzene, or a mixture thereof, from the supply tank 7 via conduit 2. The supply of feeding material through line 2 can be controlled by means of a conventional metering pump 8 and a conventional control device 9. In the preferred embodiment of the apparatus of FIG. 2 chlorinator 1 includes external heating means extending over at least a part of the lowest third of the reactor and preferably over the entire lowest third part thereof. While electrical heating means can be used for direct heating, it is preferred to use a fluid heat transfer medium and more preferred a gaseous medium such as air, which in turn can be heated with any desired heating means including electrical heating. The use of a fluid for direct heat transfer helps to prevent local overheating of the reactor. Presently, the most preferred heating means is a system circulating a gaseous medium to heat the lowest third of the chlorinator at 11. The gaseous heat transfer medium preferably surrounds the vertical inner wall of lower third of the chlorinator. For circulation it is withdrawn through line 12, passed through a heat exchanger 10 to achieve a predetermined temperature and recirculated for heating through line 11.

According to the preferred embodiment of the process heat is withdrawn from the upper two reaction zones, e.g. by cooling the upper two thirds of the chlorinator with a fluid heat transfer medium, preferably a gaseous medium such as air. In view of the cooling and heating requirements the inner side wall of the chlorinator is surrounded by a second wall to form a jacket type column. The jacket is closed at the upper and lower end and partitioned to form annular chambers around the inner wall of the chlorinator. With this arrangement the gaseous heat transfer medium for heating and cooling purposes can be supplied at predetermined portions between the inner and outer wall of the column to feed some or all of the annular chambers so as to heat or cool predetermined portions of the inner walls of the chlorinator. This will be more fully explained below in connection with FIG. 3.

Preferably, the top part constituting the upper third of the chlorinator wall is cooled to a greater degree than the central part constituting the middle third. If air is used as the heat transfer medium for cooling purposes, the cooling effect can be controlled in a convenient manner by regulating the amount of air introduced into a given portion of the jacket. For example, air at ambient temperature is fed into the jacket at 13 and withdrawn at 15. The feeding rate and the temperature of the air used as the cooling medium can be controlled by means of a blower or ventilator (not shown). The central third of the chlorinator in the apparatus of FIG. 2 preferably is cooled in an analoguous manner as the top third but at a somewhat lower degree, e.g. by introducing air at ambient temperature at 14 into the jacket and withdrawing the air at 16. Preferably, the same gaseous medium is used for cooling and heating, but different gases can be used.

Gaseous chlorine for the reaction is fed into the lower part of the chlorinator through line 17. Preferably, the chlorine is introduced somewhat above the bottom of the chlorinator. It is preferred if the distance between the bottom of the chlorinator and the opening of the chlorine feeding line in the chlorinator correspond essentially to the inner diameter of the chlorinator. Normally, this distance should not exceed twice the inner diameter of the chlorinator. The chlorine is supplied from a conventional chlorine source (not shown) via a metering and controlling device 18 and a heat exchanger 19. In this heat exchanger the chlorine preferably is pre-heated to a temperature of about 80°–120°C. Using such pre-heated chlorine the temperature of the air introduced at 11 for heating purposes generally can be in the range of 250°–300°C.

As mentioned above, the temperature of the air introduced at 13 and 14 is not overly critical and air at ordinary ambient temperature, e.g. between about 0° and 30°C, can be used. Any normal temperature difference can be compensated by enhancing or diminishing the rate of the air supply.

A collector 22 is arranged below the bottom 20 of chlorinator 1 to accept the hexachlorobenzene product. Preferably, this collector is heated externally, e.g. directly by electrical means, to keep the product in a liquid state, i.e. at about 230°C. Preferably, the collector forms a hydraulic lock so that liquid hexachlorobenzene product can be withdrawn at the rate of its formation through withdrawing line 23 from the closed reaction system, poured in suitable containers 24 and left to solidify therein.

Preferably, the chlorinator 1 is provided with a bed of packing material comprising filling or packing bodies of different or uniform sizes and shapes. Suitable packings are well known in the art and can be used provided that they are substantially resistant against chlorine at the reaction conditions. For example, annular bodies of glass or ceramic materials, e.g. Raschig rings, can be used. The inner wall of the chlorinator, i.e. the surface in contact with the reaction, should consist of a material which is substantially resistant to chlorine. A suitable material is cast iron, at least for the heated parts of the chlorinator, and the wall can be coated with or consist of such materials as glass or ceramics. In an analoguous manner, the packings can comprise a material which is not resistant against chlorine provided that they have a protective coating substantially resistant against chlorine.

Size, form and degree of packing of the filling bodies depend upon the size of the chlorinator and the desired throughput. Optimum sizes, forms and distributions can be selected according to the rules well known in the art of equilibrium processes including reactions in the liquid-gaseous phase. In general, the particulars of the packing should be selected such that upon introduction of chlorine at a relatively low pressure, e.g. corresponding to about 5–20 Centimeters water column, preferably about 10 cm water column, an effective continuous operation of the process will be achieved. In general, it is preferable to use reactor columns with a relatively wide inner diameter. The preferred ratio of the length of the column to the inner diameter of the column is at least 15:1, preferably about 20:1. Preferably, the pressure in the chlorinator is slightly above atmospheric pressure, i.e. with an overpressure in the order of the chlorine pressure explained above.

The chlorine gas for the chlorination preferably is a dry gas having commercial purity, e.g. consisting of at least 90% by weight, preferably about 99% by weight, of $Cl_2$. Conventional nuclear halogenation catalyst can be used for the chlorination, e.g. ferric chloride (the preferred catalyst), aluminum chloride, metallic iron, iodine, heavy metals, susceptible to chlorine formation, and chlorides of the heavy metals, and other well known catalysts, single or in mixture. Preferably, a catalyst is used in trace amounts, i.e. in amounts of well below 0.1%, based upon the weight of the reaction product, but larger amounts, e.g. up to 5% by weight can be used. Preferably, it is used in amounts of 0.01–0.001% by weight or even lower. While the catalyst can be introduced separately it is generally preferred to continuously supply the catalyst or the catalyst mixture at the desired rate with one or both of the reactants, i.e. with the chlorine gas and/or the chlorobenzene starting material. Also, it is possible to continuously form the catalyst in the reaction, e.g. where part of the chlorinator walls, or some of the packings or devices in operative connection, such as the heat exchanger for pre-heating the chlorine include a metal susceptible of forming the catalyst under the reaction conditions. Introduction proper of catalyst is not required in this case. Generally, it is desirable to supply the catalyst, or form the catalyst, at a rate which does not lead to catalyst accumulation in the reaction and to withdraw catalyst with the hexachlorobenzene product at the rate at which the catalyst is introduced or produced in the reaction. In view of the fact that trace amounts of catalyst in the order of 0.001% by weight of the combined reactants are sufficient and particularly if the preferred ferric chloride is used the color of the hexachlorobenzene product can be used to visually control supply and withdrawal of the catalyst. Preferably, the catalyst is supplied or formed and then withdrawn at a rate such that the hexachlorobenzene product is still white or only slightly yellow.

Figure 3:
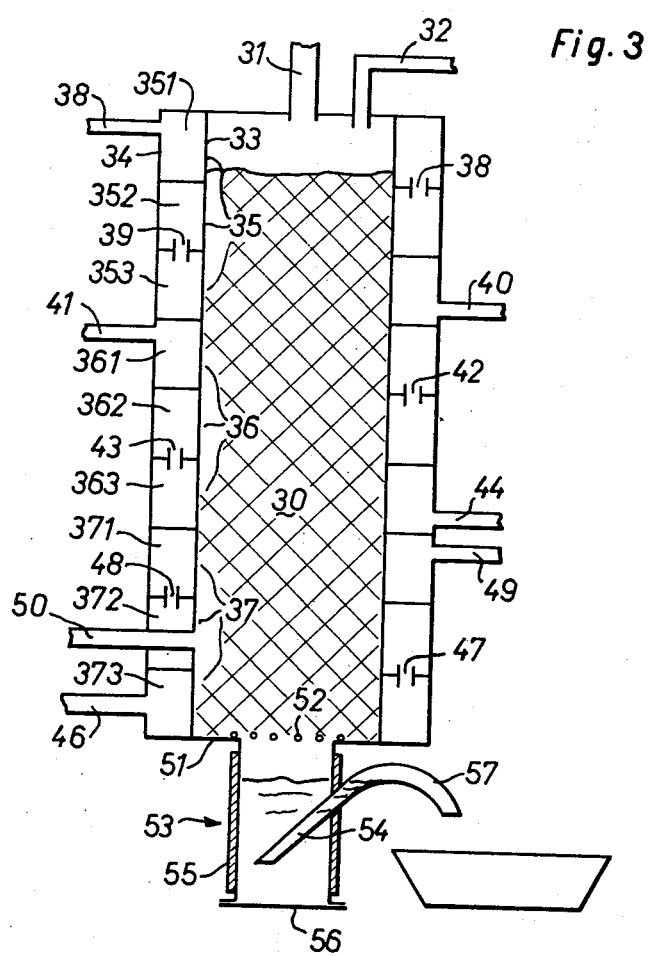
FIG. 3 shows a diagrammatic sectional view of a preferred chlorinator according to the invention.

FIG. 3 illustrates a preferred embodiment of the chlorinator or reaction column according to the invention in a diagrammatic cross-sectional view. The inner space 30 of the reactor comprises a bed of packings as discussed above (not specifically shown in the drawing). The packing bed preferably extends upwardly into the vicinity of line 31 for HCl withdrawal or feeding line 32 for the starting chlorobenzene supply. The chlorinator is a jacket column with an inner wall 33 and an outer wall 34. The jacket comprises three main sections which are sub-divided into annular sub-sections. The top section 35 comprises three (or more, or less) annular chambers 351, 352, 353. At 38, the first chamber 351 is supplied with air at ambient temperature by means of a blower not shown. Via conduit 38 the cooling air is introduced from chamber 351 into the subsequent chamber 352 and from there through conduit 39 into chamber 353. The cooling air which by now has a higher temperature is blown out or withdrawn through conduit 40 into the atmosphere. In an analoguous manner the subsequent section 36 consists of three annular chambers 361, 362, 363 interconnected by means of conduits 42 and 43. From chamber 363 the cooling air having an elevated temperature is blown via conduit 44 into the atmosphere. It is noted that not all of the chambers need be supplied with the heat transfer media. Exhausts, blowers or propellers suitable to convey the gaseous heat transfer media for cooling and heating are well known in the art and, hence, not shown in the drawing.

The lowest third 37 of the chlorinator is supplied at 46 with hot air, e.g. having a temperature of about 250°–300°C. Again, this section is sub-divided into a plurality of annular chambers. Hot air is introduced first into chamber 373 and from there through conduit 47 into the subsequent chamber 372, then through 48 into chamber 371 and into the withdrawing line 49. For this heating section a closed circuit is preferred, e.g. the hot air withdrawn at 49 is transported by means of a conventional blower not shown in the drawing through a heat exchanger (not shown) where it is heated to a temperature of about 250°–300°C and then recirculated through conduit 46. Again, as with the cooling means, more or fewer annular chambers can be provided and not all chambers need be supplied with the heat transfer medium provided that the desired temperature distribution explained above is achieved in the chlorinator.

Chlorine gas, pre-heated as explained above in a device not shown, is introduced into the bottom third of the chlorinator via conduit 50. At the bottom 51 there is provided a screen or equivalent device to retain the packings in the chlorinator but to permit passing of the hexachlorobenzene product in a molten state. The screen is essentially resistant to chlorine and similar screens may be arranged to support the packing as desired. Molten product is collected in collector 53 provided with an electrical heating means 55. The bottom of the collector includes a flanged bottom 56 which can be removed for cleaning or repair purposes. A dip tube 54 is arranged in the collector to permit withdrawal of the liquid product while maintaining the top level of the liquid product in the collector at a predetermined height corresponding to curve 57 of the dip tube and at the same time effectively closing the reactor bottom. Since the end of the dip tube will always be submerged during operation in the liquid product the collector and the dip tube form a hydraulic lock of the chlorinator.

Preferred embodiments of the process of the invention will now be illustrated by means of specific examples. The examples are not intended to limit the scope of the invention.

EXAMPLE 1

A column of the type illustrated in FIG. 3 is used in the apparatus arrangement depicted in FIG. 2. The chlorinator has a length of about 7 meters, an inner diameter of 350 millimeters and a packing of 50 millimeter Raschig rings of ceramic material. 43 Kilograms of commercial trichlorobenzene (waste product from lindane production) per hour are introduced at the top of the chlorinator by means of the metering pump. Simultaneously, 47 kg of chlorine gas, pre-heated to about 110°C in the chlorine heat exchanger, are introduced per hour into the chlorinator at a distance of about 60–70 cm above the bottom of the column. This amount of chlorine is about 5% byweight smaller than the amount necessary for a complete conversion of the starting trichlorobenzene into hexachlorobenzene.

During continuous operation 63 kg per hour of 99% hexachlorobenzene product are withdrawn via the collector. The melting point of the product is in the range of 220°–225°C. This corresponds to a 99% yield considering that about 2 kg of trichlorobenzene are withdrawn from the reaction together with the hydrogen chloride.

The reaction rate is about 94% by weight.

The collector is heated to a temperature of about 230°C. Temperature sensors arranged at the center of the chlorinator at various locations indicate that the temperature at the center of the chlorinator at the upper end of the heated zone was about 240°C while the corresponding temperature at the lower end of the heated zone was about 215°C. The temperature of the heated air fed into the lowest part of the jacket was about 270°C while the air exit temperature at the upper end of the top annular heating chamber was about 215°C. The supply of cooling air to the two top thirds of the jacket of the chlorinator was controlled such that the temperature sensors between the two cooling zones indicated about 200°C while the temperature indicated at the top of the uppermost cooling zone, i.e. at the top of the chlorinator, was about 50°C.

The hydrogen chloride withdrawn at the top of the reactor contained 4–6% of trichlorobenzene and was treated in the subsequent absorber to form a 30% aqueous hydrochloric acid. The trichlorobenzene withdrawn together with the hydrogen chloride was separated from the hydrochlorid acid and used for chlorination again.

EXAMPLE 2

In accordance with the general procedure of Example 1 using the same apparatus 60 kg/h of liquid tetrachlorobenzene oils (commercial mixture of isomers) were introduced at the top of the reactor while 37–38 kg/h of pre-heated chlorine gas were introduced at the lower end of the chlorinator. In order to prevent solidification of the starting tetrachlorobenzene oils (mp 30°–35°C) the supply container and the supply conduit are heated to a temperature of about 50°C. The temperature distribution in the chlorinator was similar to the one explained in Example 1 and achieved in essentially the same way. The lowest third of the chlorinator was heated such that the temperature at the center increased from 220°C adjacent the bottom to about 240°C at the end of the heated zone. The temperatures of the two top thirds were somewhat lower than those in Example 1, even though the cooling rate was the same. In this Example the temperature in the central third was about 5°–10°C lower and in the top third about 10°–12°C lower. The actual temperatures were 240°C at the bottom of the first cooling zone (second third), 190°C at the boarder between the two cooled zones and 40°C at the top of the chlorinator. The hydrogen chloride withdrawn carried about 1.5 kg of the starting tetrachlorobenzene oils which were recovered in the manner explained in Example 1.

Continuous operation yields 75.5 kg of a 99% hexachlorobenzene which is slightly colored and has a melting point of 218°–223°C. The yield is about 98%, the rate of reaction about 96%.

In both Examples there were no special provisions for introduction of catalyst. The chlorine feeding line in the heat exchanger consisted of iron if this led to formation of sufficient ferric chloride in the chlorine stream to maintain continuous chlorination without accumulation of catalyst and without an undue coloring of the product.

The hexachlorobenzene product obtained according to the process of the invention can be used for all purposes where prior art hexachlorobenzene has been used with the added advantage that the present product is of higher purity than most commercial grades hexachlorobenzenes. Specific examples for the use of hexachlorobenzene are well known in the art, e.g. direct use as pesticide, for treatment of seeds, or indirect uses, i.e. as intermediate product for the production of pentachlorophenol and the ethers thereof. The latter products can be directly obtained from the present hexachlorobenzene by hydrolytic and specifically oranolytic treatment of the hexachlorobenzene, e.g. with an organic hydroxy compound, such as an alcohol or phenol, to yield the corresponding alcohol ether of pentachlorophenol.

It should be apparent from the foregoing detailed description that the objects set forth at the outset of the specification have been successfully achieved.

Accordingly, What is claimed is:

1. A process for continuous production of hexachlorobenzene comprising the steps of providing a reaction zone supplied counter currently with chlorine from a lower end of said reaction zone and a chlorobenzene selected from the group consisting of trichlorobenzene, tetrachlorobenzene, and mixtures thereof, from an upper end of said zone, said reaction zone containing a catalyst effective to promote nuclear chlorine substitution; continuously withdrawing hexachlorobenzene product consisting of at least 90% by weight of hexachlorobenzene based upon the weight of said withdrawn hexachlorobenzene product at said lower end of said reaction zone while withdrawing hydrogen chloride at said upper end of said reaction zone; simultaneously maintaining a temperature of above about 200°C over a part of said reaction zone situated in the vicinity of said lower end supplied with chlorine and a temperature of about 60°C ± about 40°C at said upper end supplied with the chlorobenzene.

2. A process for continuous production of hexachlorobenzene comprising the steps of providing a chlorination zone supplied counter currently with gaseous chlorine from a lower end of said chlorination zone and a chlorobenzene selected from the group consisting of trichlorobenzene, tetrachlorobenzene and mixtures thereof from an upper end of said chlorination zone; said chlorination zone containing a catalyst effective to promote nuclear chlorine substitution; withdrawing molten hexachlorobenzene product consisting of at least 90% by weight of hexachlorobenzene based upon the weight of said withdrawn hexachlorobenzene produce at said lower end of said chlorination zone while withdrawing hydrogen chloride at said upper end of said chlorination zone; the amount of said gaseous chlorine supplied at said lower end of said reaction zone being equal to the amount of chlorine necessary to convert at least 90% of said chlorobenzene into hexachlorobenzene; and maintaining a temperature of above about 200°C in a part of said chlorination zone situated at said lower end and adjacent thereto, and simultaneously maintaining a temperature of about 60°C ± about 40°C at said upper end.

3. A process for continuous production of high purity hexachlorobenzene in a single stage process comprising the steps of providing an essentially vertical chlorination zone supplied counter currently with a stream of pre-heated gaseous chlorine from a lower end of said chlorination zone and a stream of chlorobenzene selected from the group consisting of trichlorobenzene, tetrachlorobenzene, and mixtures thereof, from an upper end of said chlorination zone; said chlorination zone comprising a catalyst effective to promote nuclear chlorine substitution; withdrawing a stream of molten hexachlorobenzene product consisting of at least 90% by weight of hexachlorobenzene based upon the weight of said withdrawn hexachlorobenzene product from said lower end of said chlorination zone while withdrawing a stream of gaseous hydrogen chloride from said upper end of said chlorination zone; the rate of said stream of pre-heated chlorine supplied at said lower end of said reaction zone being selected to provide the amount of chlorine required for conversion of 90–100% of said chlorobenzene into hexachlorobenzene; externally heating a part of said chlorination zone near said lower end to generate a predetermined temperature of above about 200°C in said part of said chlorination zone near said lower end; and externally cooling a part of said chlorination zone near said upper end to generate a predetermined temperature of about 60°C ± about 40°C at said upper end of said chlorination zone, both temperatures simultaneously being present in said chlorination zone.

* * * * *